(12) United States Patent
Zhang et al.

(10) Patent No.: US 11,940,009 B2
(45) Date of Patent: Mar. 26, 2024

(54) BEARING SEAL AND APPLICATIONS THEREOF

(71) Applicant: Aktiebolaget SKF, Gothenburg (SE)

(72) Inventors: Meng Zhang, Shanghai (CN); Keqiang Cao, Shanghai (CN); Yi Zhang, Shanghai (CN); He Zhu, Shanghai (CN)

(73) Assignee: Aktiebolaget SKF, Gothenburg (SE)

(*) Notice: Subject to any disclaimer, the term of this patent is extended or adjusted under 35 U.S.C. 154(b) by 0 days.

(21) Appl. No.: 17/861,674

(22) Filed: Jul. 11, 2022

(65) Prior Publication Data

US 2023/0013507 A1    Jan. 19, 2023

(30) Foreign Application Priority Data

Jul. 16, 2021    (CN) .......................... 202110804451.0

(51) Int. Cl.
*F16C 19/06*    (2006.01)
*F16C 33/78*    (2006.01)
*F16C 33/80*    (2006.01)
*F16H 49/00*    (2006.01)

(52) U.S. Cl.
CPC .......... *F16C 33/7823* (2013.01); *F16C 19/06* (2013.01); *F16C 33/7889* (2013.01); *F16C 33/80* (2013.01); *F16H 49/001* (2013.01)

(58) Field of Classification Search
CPC .... F16C 19/06; F16C 33/7823; F16C 33/783; F16C 33/7889; F16C 33/80; F16C 2361/61; F16H 49/001
See application file for complete search history.

(56) References Cited

FOREIGN PATENT DOCUMENTS

| DE | 102013215259 B4 | * | 3/2017 | ............. F16C 27/04 |
|---|---|---|---|---|
| DE | 102021103963 A1 | * | 9/2021 | |
| WO | WO-2011155354 A1 | * | 12/2011 | ............ F16C 33/667 |

* cited by examiner

*Primary Examiner* — Phillip A Johnson
(74) *Attorney, Agent, or Firm* — GARCIA-ZAMOR INTELLECTUAL PROPERTY LAW, LLC; Ruy Garcia-Zamor

(57) ABSTRACT

A bearing seal including an anchoring portion fixed on an inner ring of the bearing, and a sealing portion capable of forming a sealing fit with an outer ring of the bearing, the seal providing rigid slinger of substantially circular shape, the slinger having a root portion formed at a position corresponding to the anchoring portion for stabilization and support, and a radial portion formed in the section corresponding to the area between the anchoring portion and the sealing portion for radial support, wherein the radial portion is formed with at least one slot with the opening direction facing the radial periphery.

9 Claims, 2 Drawing Sheets

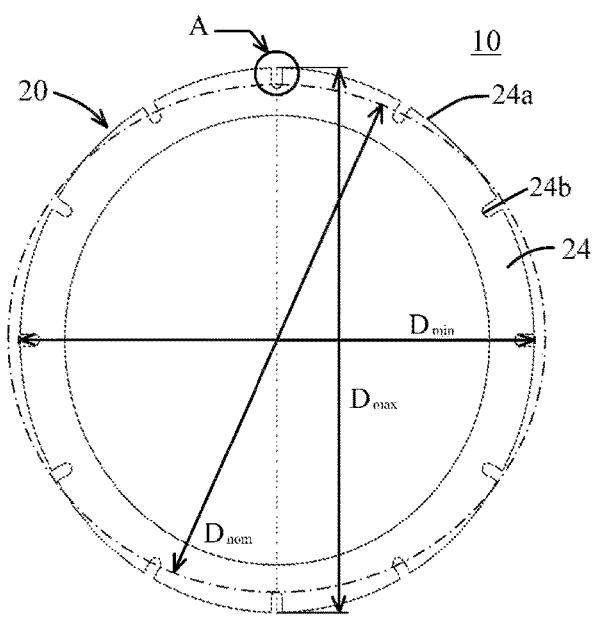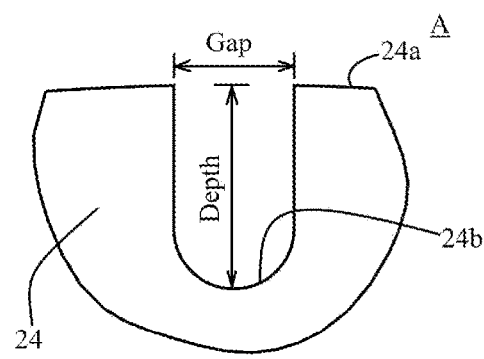
Fig. 2B　　　　　　　　　　　Fig. 2C
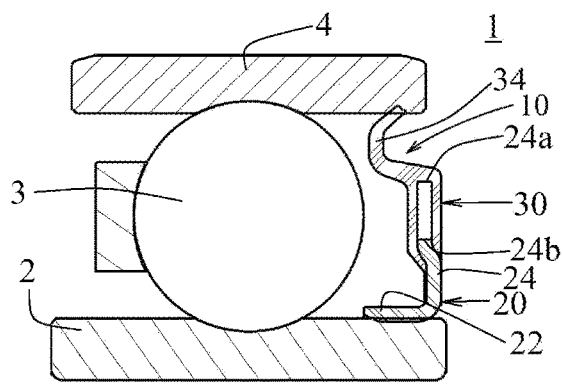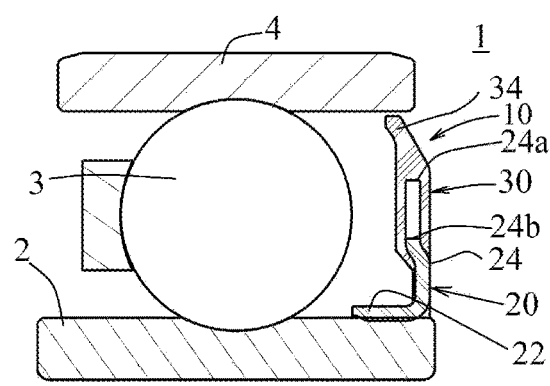
Fig. 3A　　　　　　　　　　　Fig. 3B

BEARING SEAL AND APPLICATIONS THEREOF

CROSS-REFERENCE TO RELATED APPLICATIONS

This application claims priority to Chinese Patent Application no. 202110804451.0, filed Jul. 16, 2021, the contents of which is fully incorporated herein by reference.

TECHNICAL FIELD

The invention relates to a bearing seal, especially a seal for flexible bearings used in harmonic drives (also named "harmonic reducers").

BACKGROUND ART

Harmonic drives have been widely used in the field of transmission due to the characteristics of large transmission ratio, stable operation and low noise, precision and reliability, as well as long lives. In general, the structure of a harmonic drive mainly includes a rigid circular spline with internal teeth, a flexible spline (hereinafter simplified as "flex spline") with external teeth, and a harmonic generator (also named "wave generator") for radial deformation of the flex spline, wherein the harmonic generator is mainly composed of a cam and a flexible bearing (a kind of thin-walled bearing) fitted on the cam through elastic deformation. In the case of an elliptical cam, for example, the number of cycles of waveform changes experienced at any point on the ring of the flex spline is twice for each 360° rotation of the harmonic generator driven by the rotating shaft, so such cam is also called double-wave cam. Depending on the needs of the applications, the cam can also be a three-wave, four-wave or even more multi-wave cam.

The outer ring of the flexible bearing used in the harmonic drives is subjected to regular forced deformation under the drive of the harmonic generator, which not only poses a severe test to the fatigue characteristics of the material, but also makes it difficult for traditional bearing seals to adapt. FIG. 1A shows a schematic cross-section of a conventional ball bearing. As can be seen from the figure, the bearing 1 includes an inner ring 2, an outer ring 4 and at least one row of rolling elements 3 arranged between the inner ring 2 and the outer ring 4, and seals 10 are provided on both axial sides of the bearing 1. FIGS. 1B-1C further show enlarged cross-sectional views of the bearing seal 10 at different scales. As can be seen in the figures, the seal 10 generally comprises a rigid flinger 20 and an elastic material 30 attached to the periphery of the flinger. The seal 10 is formed with an anchoring portion 12 on the radially outer side thereof and a sealing portion 14 on the radially inner side thereof. The flinger 20 is formed with a root portion 22 for stability and support at a position corresponding to the anchoring portion 12, and a radial portion 24 for radial support at a section corresponding to the area between the anchoring portion 12 and the sealing portion 14. After assembly, the anchoring portion 12 is fixedly arranged in a groove 42 of the bearing outer ring 4 for support such that a sealing fit is formed between the sealing portion 14 and the inner ring 2.

With the above seal 10, when the bearing outer ring 4 is forcibly deformed, the rigid flinger 20 is easily axially twisted and/or displaced, causing the anchoring portion 12 to come out of the groove 42 of the outer ring 4. The above-mentioned problem made it impossible to use the existing seals for the flexible bearings in the harmonic drives, thus necessitating a turn to the following two remedial measures: First, strengthening the seal on the periphery of the harmonic drive, trying to protect the flexible bearing as a built-in part of the drive; Second, injecting excess grease into the bearing in an attempt to ensure long-term bearing lubrication without seals.

However, the effect of the above measures is not ideal. First of all, the rigid spline and the flex spline are both built-in components of the harmonic drive, and the meshing between (the inner teeth and the outer teeth of) the two will generate a large amount of wear debris during operation, and the debris can enter the open bearing without restriction. In other words, the outer seal cannot prevent the transfer of impurities between the built-in components. Second, injecting excess grease into the open bearing is extremely wasteful, not only increasing operating costs (as greases are expensive), but also causing unnecessary environmental pollution from a large amount of lost grease.

The reality calls for a bearing seal that can adapt to the radial deformation of the harmonic generator and has good sealing performance as well.

SUMMARY OF THE INVENTION

In order to solve the above-mentioned technical problems, the present invention provides a bearing seal which includes an anchoring portion that can be fixedly arranged on the inner ring of the bearing and a sealing portion that can form a sealing fit with the outer ring of the bearing. The seal comprises a substantially annular rigid flinger. The flinger is formed with a stabilizing and supporting root portion at a position corresponding to the anchoring portion, and a radial portion for radial support at a region corresponding to the area between the anchoring portion and the sealing portion. The radial portion is formed with at least one slot with the opening direction facing the radial periphery.

Due to the peripheral slot, the rigid flinger can effectively release its internal stress when the inner ring of the bearing is forcibly deformed, so that distortion and/or displacement will not easily occur, resulting in the sealing fit between the sealing portion and the outer ring being firmly maintained. The seal of the above structure is suitable for flexible bearings and harmonic drives fitted with flexible bearings, avoiding the use of excessive lubricants at all and reducing operating costs as well as being of great environmental value.

On the basis of the seal of the above structure, the present invention also provides a sealed bearing comprising an inner ring, an outer ring and at least one row of rolling elements arranged between the inner and outer rings. The bearing is equipped with the flexible seal with radial slots formed at the periphery of the flinger.

The above-mentioned bearing, especially the flexible bearing, when equipped with the seals that can adapt to the radial deformation of the bearing rings, ensures long-lasting and reliable operation even when the bearing is subjected to forced deformation, and therefore is particularly suitable for the application of flexible sealed bearings in harmonic drives.

Based on the above-mentioned seal and sealed bearing, the present invention also provides a harmonic drive comprising a rigid spline having inner teeth, a flex spline having outer teeth, and a harmonic generator for causing the flex spline to generate dynamic harmonics, wherein the harmonic generator comprises a cam and the above-mentioned sealed bearing assembled on the cam.

The harmonic drive fitted with the above-mentioned sealed bearings thus achieves a long-lasting, reliable and stable operation, which is of great importance for extending the maintenance intervals and service life of the entire drive system.

Various specific embodiments and beneficial technical effects of the present invention are described in detail below in conjunction with the accompanying drawings.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings.

FIG. 2B shows a side view of the flexible seal in FIG. 2A in an axial view;

FIG. 2C shows a partial enlargement of a slot in FIG. 2B;

FIG. 3A shows a cross-sectional view of a bearing fitted with a flexible seal with a contact sealing lip; and FIG. 3B shows a cross-sectional view of a bearing fitted with a flexible seal with a non-contact sealing lip.

DETAILED DESCRIPTION OF EMBODIMENTS

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In the following description, terms indicating directions, such as "axial", "radial" and "circumferential direction", unless otherwise specified or delimited, refer to the axial, radial and circumferential directions of the seal, its flinger or the bearing to which the seal belongs.

Figure 2A:
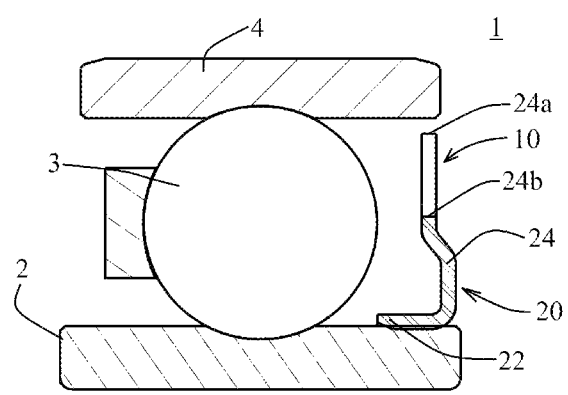
FIG. 2A shows a cross-sectional view of a flexible bearing with a flexible seal provided on the inner ring of the bearing.

FIGS. 2A-2C show, in general, the schematic views of the structure of the flexible seal described in the present invention in various views, wherein FIG. 2A shows the schematic cross-section of a flexible bearing assembled with the flexible seal. In the specific embodiment illustrated, the seal 10 is formed independently of a rigid flinger 20 in general. The flinger 20 is preferably made of a metal (e.g., carbon steel), has a substantially L-shaped cross section, and contains an axial portion 22 that can be secured to the bearing inner ring 2 by an interference fit and a radial portion 24 that extends radially outward from an end of the axial portion 22.

The axial portion 22 is used on the one hand to secure the seal 10 to the inner ring 2 of the bearing and on the other hand also acts as the root portion (as previously described) to stabilize and support the entire seal 10. The radial portion 24 acts as a radial support for the seal 10, and the free end 24a of its radial periphery forms a clearance fit with the bearing outer ring 4, forming a so-called non-contact seal. As long as the clearance is sufficiently small, or if a labyrinthine gap fit is used, the non-contact seal is sufficiently resistant to the ingress of external contaminants (e.g., debris from gear tooth friction) and the leakage of internal grease. Theoretically, a non-contact seal does not generate friction and therefore does not cause temperature rise effects or a reduction in bearing efficiency.

It is should be noted that in the above specific embodiment, the anchoring portion of the seal 10 is directly filled by the axial portion 22 of the metal flinger 20, and the sealing portion of the seal 10 is directly filled by the free end 24a of the radial portion 24. In a more general case, the outer surface of the flinger 20 may also be covered with an elastic material 30 such as rubber, forming the anchoring portion of the seal 10 at the position corresponding to the axial portion 22 and the sealing portion (e.g., a sealing lip 34, to be described later). of the seal 10 at the position of the free end 24a of the radial portion, respectively.

FIGS. 2B to 2C show that the flinger 20 is formed with a plurality of slots 24b in the radial portion 24, with the opening directions facing radially outward. The provision of the slots 24b can reduce the areal moment of inertia of the annular flinger, thus improving its ability to adapt to the radial deformation of the inner ring of the bearing. In other words, the provision of the slots 24b can effectively reduce the rigidity of the annular flinger 20 and increase the lower threshold of the radial deformation required to trigger axial twisting or displacement of the flinger.

It is easy to understand that the depth of the slots Depth (as shown in FIG. 2C) and the rigidity of the slinger show a negative correlation. That is, the greater the depth of the slots, the softer the slinger will become and the stronger the ability of the slinger to adapt to the radial deformation of the bearing ring. However, excessively deep slots, for example, through the entire radial portion 24 right up to the axial portion 22, would completely destroy the rigidity and stability of the radial portion, causing the radial portion to tilt sideways or stand unstable after the seal is installed, making it difficult to meet the function required to close the openings of the bearing. Therefore, the depth of the slots needs to be somewhat limited. Tests have shown that the depth of the slots Depth should not exceed ⅔ of the radial portion size (i.e., the height of the free end 24a above the upper surface of the axial portion 22).

FIG. 2B further shows a morphological comparison chart of the slinger deformation triggered by an elliptical cam, where the dashed part shows the outline of a standard circular morphology before the slinger deformation. The analysis shows that in the case of cam-induced elliptical deformation, the radial portion 24 of the slinger is subjected to the greatest compressive stress at the position corresponding to the short axis of the ellipse $D_{min}$ and the greatest tensile stress at the position corresponding to the long axis of the ellipse $D_{max}$. The presence of the slots can release the above stresses through the contraction and expansion of the gap Gap, fundamentally avoiding the possibility of warping or shifting of the slinger.

Therefore, for the release of the compressive stress, the slot gap Gap should be able to accommodate at least the circumference reduction of the radial portion from the standard circular form at the time of undeformation to the elliptical form after deformation. In this sense, the average width of the slots Gap$\geq \pi*(D_{nom}-D_{min})/n$, where $D_{nom}$ is the standard circular outer diameter of the slinger when undeformed, $D_{min}$ is the shortest outer diameter of the slinger after assembly deformation (corresponding to the length of the short axis of the ellipse), and n is the number of the slots.

From another point of view, especially in the case where the slinger 20 independently constitutes the seal 10, the smaller the width Gap of the slot, the more effective it is in preventing foreign body intrusion and lubricant leakage. Therefore, from the need to meet the minimum protection requirements, the width Gap of the slot should not exceed 5 mm.

In addition, the slots are preferably distributed regularly (e.g., equally spaced) in the circumferential direction, and the greater the number and the denser the distribution, the more favorable the release of various stresses. Still take the elliptical cam as an example, since the deformation is most serious near the long and short axes, the stresses are relatively concentrated there (hereinafter referred to as "stress concentration areas"), and the dense distribution of slots will lead to a high probability of existence of the slots near the stress concentration areas, which is especially conducive to the release of concentrated stresses. In addition, the number of slots should be related to the profile pattern of the cam (i.e., the number of harmonics). Assuming that the number of harmonics of the cam is n, the number of slots should be at least 2n, as a sufficient number of slots can more effectively relieve the circumferential stresses generated when the seal is forced into deformation.

As a preferred embodiment, in the case of even harmonic cam-induced deformation, the number of slots is preferably odd. This is because an odd number of slots ensures that at least one proximity slot is present near the symmetrically distributed stress concentration areas. The role played by the nearby slots in stress relief is significantly greater than that of the relatively distant slots, and is therefore particularly conducive to stress relief in the stress concentration areas. For similar reasons, in the case of odd harmonic cam-initiated deformations, the number of slots is preferably an even number.

Figure 1A:
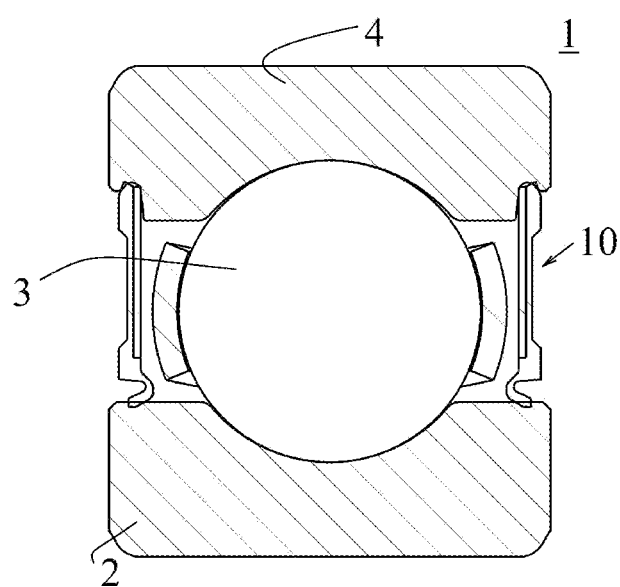
FIG. 1A shows a schematic cross-sectional view of a typical ball bearing equipped with conventional seals.
Figure 1B:
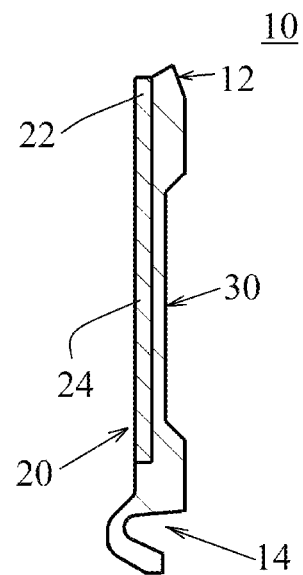
FIG. 1B shows an enlarged cross-sectional view of the right side seal in FIG. 1A.
Figure 1C:
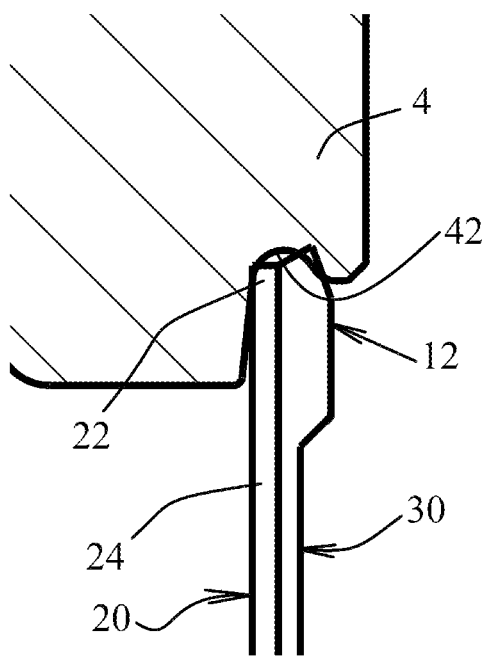
FIG. 1C shows a partially enlarged view of the bearing outer ring in FIG. 1A near a groove thereof and an anchoring portion of the seal.

FIGS. 3A and 3B show the schematic cross-sections of two other embodiments of the present invention, respectively. As can be seen in the figures, the seal 10 comprises a rigid slinger 20 and an elastic material 30 that at least partially covers the slinger 20. Similar to the case shown in FIG. 2, the axial portion 22 is fixed directly to the bearing inner ring 2 as an anchoring portion by interference fit. As an alternative, similar to the prior art situation shown in FIG. 1, the axial portion 22 can also be fixed to the bearing inner ring 2 by combining it with the elastic material 30 to form the anchoring portion 12, for example, in a groove (not shown) in the inner ring. The elastic material 30 forms a sealing lip 34 at the radial periphery of the free end 24a of the radial portion of the slinger, forming a lip seal fit with the bearing outer ring 4. As a typical scenario, the lip seal can be either a contact seal, as shown in FIG. 3A, or a non-contact seal, as shown in FIG. 3B. Contact seals will outperform non-contact seals in terms of sealing effectiveness, although they cause friction. Taking the flexible bearing in the harmonic drive as an example, the difference in speed between the inner and outer rings of the bearing is generally not high, so the sliding friction between the sealing lip and the outer ring will not cause a significant temperature rise effect and will not cause a serious obstruction effect on the normal operation of the harmonic drive.

More importantly, in the embodiments shown in FIGS. 3A and 3B, the elastic material 30 also encases the slots 24b of the radial portion 24 of the slinger, thereby improving the ability of the seal 10 to prevent foreign object intrusion and grease leakage. Since the elastic material 30 is inherently stretchable, the covering of the slots 24b does not significantly affect the ability of the slots 24b to release the strain on the slinger 20, and the stress and strain induced by the cam harmonics can still be effectively released by the expansion and contraction of the slot gaps.

The seal described above can be widely used in flexible bearings, harmonic drives, and transmission machinery containing harmonic drives (e.g., robots). It should be understood by those skilled in the art that the described seals and their applications are not limited by the specific embodiments and that the more general technical solutions will be subject to the limitations in the accompanying claims. Any changes and improvements to the present invention are within the scope of protection of the present invention, provided they conform to the limitations of the accompanying claims.

The invention claimed is:

1. A bearing seal comprising:
    an anchoring portion capable of being fixedly set on an inner ring of the bearing, and
    a sealing portion capable of forming a sealing fit with an outer ring of the bearing, the seal comprising a rigid slinger of substantially circular shape, the slinger having a root portion formed at a position corresponding to the anchoring portion for stabilization and support, and a radial portion formed in the section corresponding to the area between the anchoring portion and the sealing portion for radial support, wherein
    the radial portion is formed with at least one slot with the opening direction facing a radial periphery.

2. The seal according to claim 1, wherein the at least one slot is distributed at intervals in the circumferential direction,
    and wherein a Gap$\geq \pi(D_{nom}-D_{min})/n$, wherein the Gap is the average width of the at least one slot, $D_{nom}$ is the standard circular outer diameter of the slinger when undeformed, $D_{min}$ is the shortest outer diameter of the slinger after assembly deformation, and n is the number of slots of the at least one slot.

3. The seal according to claim 2, wherein the depth of the at least one slot does not exceed ⅔ of the radial dimension of the radial portion.

4. The seal according to claim 3, wherein the number of the at least one slot is at least twice as many as a number of cam harmonics.

5. The seal according to claim 1, wherein the slinger has a substantially L-shaped cross section, the root portion being formed by an axial portion extending axially from the radial inner end of the radial portion, the axial portion being reliably fixed to the bearing inner ring as the anchoring portion by means of a interference fit.

6. The seal according to claim 5, wherein the sealing portion comprises a sealing lip formed by a flexible material attached to the slinger, forming a lip seal fit with the bearing outer ring, the at least one slot being covered by the flexible material.

7. The seal according to claim 5, wherein no flexible material is attached to the slinger and the free end of the radial portion forms the sealing portion, forming a non-contact gap seal with the outer ring of the bearing.

8. The seal according to claim 7, wherein the Gap of the slot is not more than 5 mm.

9. A rolling bearing comprising:
an inner ring,
an outer ring, and
at least one row of rolling elements set between the inner and outer rings, wherein
the bearing is provided with a bearing seal having an anchoring portion capable of being fixedly set on an inner ring of the bearing, and a sealing portion capable of forming a sealing fit with an outer ring of the bearing, the seal comprising a rigid slinger of substantially circular shape, the slinger having a root portion formed at a position corresponding to the anchoring portion for stabilization and support, and a radial portion formed in the section corresponding to the area between the anchoring portion and the sealing portion for radial support, wherein the radial portion is formed with at least one slot with the opening direction facing a radial periphery.

* * * * *